United States Patent [19]

Rosen

[11] Patent Number: 5,107,080

[45] Date of Patent: Apr. 21, 1992

[54] MULTIPLE DEGREE OF FREEDOM DAMPED HAND CONTROLS

[75] Inventor: Michael J. Rosen, Arlington, Mass.

[73] Assignee: Massachusetts Institute of Technology, Cambridge, Mass.

[21] Appl. No.: 444,540

[22] Filed: Dec. 1, 1989

[51] Int. Cl.⁵ ...................... H01H 25/00; H01C 10/10
[52] U.S. Cl. ..................... 200/6 A; 338/98; 338/128
[58] Field of Search ............ 200/6 A, 33 R, 61.45 R; 338/98, 128–131, 132; 244/220, 223, 226–228, 230

[56] References Cited

U.S. PATENT DOCUMENTS

| | | | |
|---|---|---|---|
| 3,798,594 | 3/1974 | Funk | 200/61.45 R X |
| 3,901,466 | 8/1975 | Lambregts | 244/180 |
| 3,989,208 | 11/1976 | Lambregts | 244/182 |
| 4,069,720 | 1/1978 | Thor | 74/471 R |
| 4,094,479 | 6/1978 | Kennedy, Jr. | 244/179 |
| 4,236,685 | 12/1980 | Kissel | 244/223 |
| 4,477,043 | 10/1984 | Repperger | 244/223 |
| 4,689,449 | 8/1987 | Rosen | 200/6 A |

Primary Examiner—J. R. Scott
Attorney, Agent, or Firm—Thomas J. Engellenner

[57] ABSTRACT

Hand control devices are disclosed which provide for damping of vibrations and other unintended motion with three or more degrees of freedom. In one embodiment, a four degree of freedom damped hand control is illustrated, including a chamber filled with a viscous fluid, and a transmission which couples movement of a handle in the X, Y and Z directions and rotation in a θ direction about one of the axes to movements of one or more drag elements in the fluid. The hand control further includes a position-sensing and a rotation-sensing assembly for sensing the position of the handle relative to a reference frame and for generating electrical signals indicative of the position and angle.

22 Claims, 3 Drawing Sheets

MULTIPLE DEGREE OF FREEDOM DAMPED HAND CONTROLS

BACKGROUND OF THE INVENTION

This invention relates to hand controls and, in particular, to hand controls employing damping techniques which damp involuntary user motion.

Hand control systems are employed in a wide range of applications, for example, in controlling air and land vehicles and in remote control applications. These hand control systems can be responsive not only to desired hand motions, but also to random hand motions due to pathological tremors, vibrations and other motions induced by the user's environment, such as air turbulence or rough terrain. Generally, the random hand motions become superimposed upon intended voluntary hand motion and, consequently, these unintended hand motions become translated into undesired system motion. Suppression of these random and induced hand motions would reduce deviations between the desired and actual system performance.

In the context of aeronautics, both helicopters and airplanes are increasingly controlled by "fly-by-wire" techniques wherein there is no direct mechanical linkage between the pilot/operator and the vehicle control surfaces The side-arm control sticks being developed for fly-by-wire helicopters typically incorporate four degrees of freedom. Since airframe vibration is a serious concern in helicopter design, damping is desirable in sidearm controllers to prevent potentially unstable growth of vibrations coupled through the pilot's arm and the control stick.

Prior approaches to this problem have relied primarily on electronic damping techniques. Circuits which damp electronic control signals are disclosed, for example, in U.S. Pat. Nos. 3,989,208 and 3,901,466 issued to Lambregts; and in U.S. Pat. No. 4,094,479 issued to Kennedy, Jr. Unfortunately, such approaches add complexity to the signal processing of "fly-by-wire" systems.

A hybrid electromechanical damping system is disclosed in U.S. Pat. No. 4,477,043 issued to Repperger. In this patent, an aircraft control stick having two degrees of freedom is equipped with variable tension springs and dampers which can be adjusted to resist undesirable forces. A processor-based system senses forces exerted on the aircraft (e.g., by acceleration) and generates a signal for causing the control stick to resist such forces. Another active force feedback system for aircraft is disclosed in U.S. Pat. No. 4,236,685 issued to Kissel. However these types of "active control" are also quite complicated in application.

A mechanical damping system for an aircraft sidearm controller is disclosed in U.S. Pat. No. 4,069,720 issued to Thor. In this system, a two-axis side controller is equipped with two discrete rotational dashpots to damp vibrations. However, this system is rather cumbersome and requires adjustments so that the controller is properly positioned vis-a-vis the physiological center of rotation of the pilot's hand in each instance. Additionally, both Thor's system and that disclosed in the Repperger patent inherently have preferred directions, i.e. directions in which rotation occurs about only one of the axes. This effect is particularly pronounced when movement of the hand control is in a direction only slightly different from one of the preferred directions; in such instances, the slip-and-stick sensations of overcoming Coulomb friction can leave the operator with a feeling of unevenness in use.

There exists a need for better hand control systems that can provide better and simpler damping mechanisms. Moreover, there exists a need for hand controls that have more than two degrees of freedom and employ damping techniques without directional preferences to suppress unwanted user hand motions. Furthermore, there exists a need for better manual controls for helicopters and other aircraft, which controls are relatively insensitive to induced hand motions, for example, from airframe vibration or turbulent air.

SUMMARY OF THE INVENTION

Hand control devices are disclosed which provide for damping of vibrations and other unintended motion with three or more degrees of freedom. In one embodiment, a four degree of freedom damped hand control is illustrated, including a chamber filled with a viscous fluid, and a transmission which couples movement of a handle in the X, Y and Z directions and rotation through an angle $\theta$ about one of the axes to movements of one or more drag elements in the fluid. The hand control further includes a position-sensing assembly for sensing the position (and rotation) of the handle relative to a reference frame and for generating electrical signals indicative of the position and angle.

In one illustrated embodiment, the transmission comprises two concentric shafts. A first, inner shaft is adapted to be held by the user; and a second, outer shaft is at least partially disposed within the fluid of the chamber. A set of drag elements are coupled to the outer shaft and also disposed within the fluid to damp motions of the transmission. In this embodiment, the first shaft includes at least one thrust pin to couple the first shaft to the second shaft and the drag elements, such that upon rotation or translation of the first shaft, a force is applied to the drag elements.

As described in more detail below, the drag elements can be connected to the second, outer shaft, such that upon rotation of the transmission assembly, both drag elements will rotate together in the viscous fluid of the chamber, and upon translation of the first, inner shaft along its axis (hereinafter called the "Z" axis), the drag elements are forced to rotate in opposite directions.

The hand control also permits mechanical filtering of forces applied during simple tilting of the handle in either the X direction or the Y direction, or combinations of such movements, as typically permitted in common "joy stick" hand controls. The suppression of vibrations and other unwanted motions in the X and Y directions follow the principles set forth by the present inventor in U.S. Pat. No. 4,689,445 issued Aug. 25, 1987, and incorporated herein by reference.

The drag elements of the present invention can be annular solid elements, preferably including one or more protrusions along their outer surfaces to enhance their rotational resistance. The volume of the chamber, size of the damping elements and the viscosity of the fluid can be chosen to achieve a damping constant of about 2 to about 20 lbs-sec/ft., preferably from about 5 to about 15 lbs-sec/ft for translational handle movements. The viscous fluid is preferably a silicone oil having a viscosity of about 200,000 to about 2,000,000 cstokes. In one embodiment, the damping characteristics preferably are chosen so as to selectively reduce the amplitude of movement at or above about 3 Hertz. The degree of damping can, of course, be adapted to the needs of individual users or particular applications by simply varying the composition of the damping fluid.

The position-sensing assembly can be formed, for example, by connecting the handle via two perpendicular yokes to a pair orthogonally positioned potentiometers to sense tilts in the X direction and Y direction. As the handle is moved, it moves the yokes with it. The yokes are attached to separate potentiometers, such that any movement in the yokes results in a change in the resistance of the potentiometers.

Similarly, the position-sensing assembly can include a depth sensor for measuring translation of the handle along the Z axis and a rotation sensor for measuring rotations about the Z axis through an angle $\theta$. In the illustrated embodiment, the depth sensor can be a linear potentiometer having a housing which is mechanically coupled to one shaft to establish a reference point for the measurement of translational movement. A wiper connected to the other shaft cooperates with the potentiometer housing to change the resistance of the sensor as the inner shaft moves in and out of the transmission assembly.

The sensing assembly can further include a rotational sensor disposed, for example, about the inner shaft where it meets the upper yoke to measure rotations of the shaft relative to that yoke. The rotation sensor likewise can employ a potentiometer and, in one illustrated embodiment, includes a housing which can slide but not rotate in the upper yoke and a wiper splined to the inner shaft, such that rotation of the inner shaft induces a change in resistance.

In some applications, such as remote control of robot arms and other mechanical conveyances for the handling of hazardous or radioactive materials, the hand control mechanism can also incorporate a fast stop feature which deactivates the controller. In an illustrated embodiment, a control button is incorporated into the handle which must be depressed for handle movement to be effective e.g., in producing movement of the robotic arm. Conversely, when the button is released, the control functions automatically come to a halt.

The hand control position sensor or subsequent signal processing circuitry can also include a dead zone in which motion of the handle is not translated into changes in output. Such a zone, about the center area of handle movement can eliminate small spurious movements of the vehicle or other controlled systems when the user accidently or unintentionally displaces the handle slightly from its upright (or other null point) centering position. This dead zone can eliminate the need for, or supplement, centering (return) springs.

The invention will next be described in connection with certain illustrated embodiments. However, it should be clear that various changes, additions and subtractions can be made by those skilled in the art without departing from the spirit or the scope of the invention. For example, although the illustrated embodiments show a handle coupled to an inner shaft which is then linked to an outer shaft about which the drag elements are disposed, it should be clear that the other configurations of the shaft are also possible. Moreover, the shape of the drag elements, as well as their number, can be varied as a matter of design. Additionally, although the illustrated embodiments show a full four degree of freedom system, the invention can also be practiced to provide simpler three degree of freedom movements (e.g., only X, Y and Z movement or only X, Y and $\theta$ movement).

The hand control systems of the present invention provide damping by simpler mechanisms than the complicated electronic and electromechanical systems of the prior art. The present invention requires no mechanical adjustment for individual users and does not interfere with the normal operations of the user, making it particularly useful for aeronautic control sticks. Moreover, because of the design, there are no preferred directions which would result in a feeling of unevenness in use.

DETAILED DESCRIPTION

Figure 1:
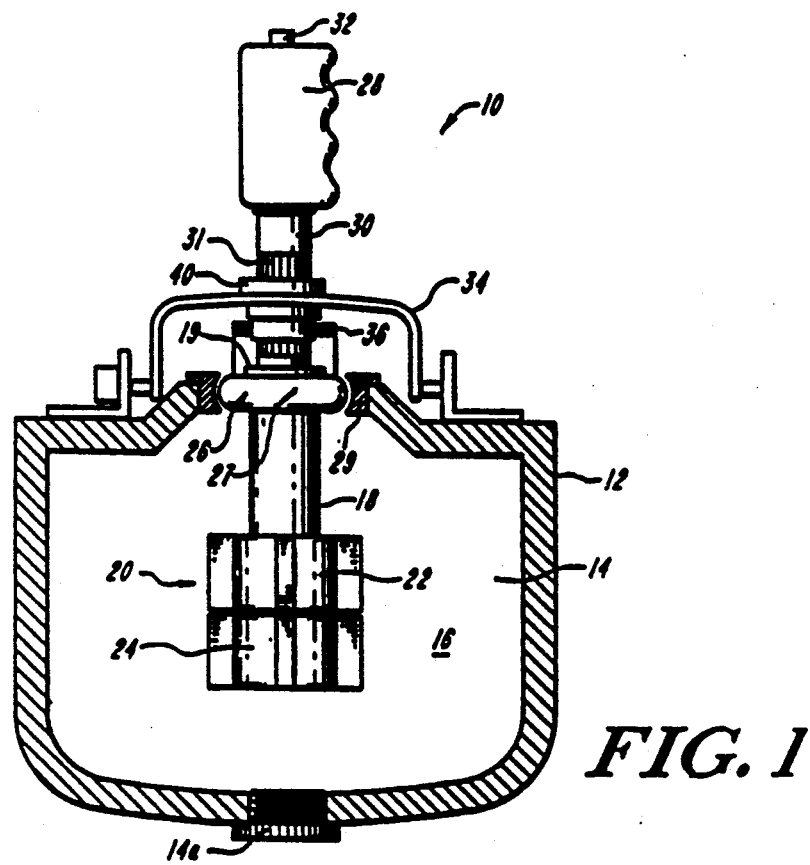
FIG. 1 is a cross-sectional view of a damped control stick according to the present invention.

FIG. 1 illustrates a damped control device 10 according to the present invention, including a housing 12 defining a chamber 14 filled with a fluid medium 16, an outer shaft 18, a drag assembly 20, a spherical bearing 26, a handle 28, and an inner shaft 30.

Spherical bearing assembly 26 further includes an outer annular element 29 and an inner spherical element 27, which are coupled to housing 12 in a ball and socket configuration whereby concentric shafts 18 and 30 can tilt and rotate about the center of annular socket 25. A low friction seal (not shown) may be incorporated between the bearing element 27 and 29 to prevent fluid leakage. In addition, a protective covering or boot (not shown) can be employed to exclude dirt from the spherical bearing assembly 26.

Outer shaft 18 is connected to housing 12 through the spherical bearing 26. Outer shaft 18 can be coupled to the inner bearing element 27 by a press fit providing outer shaft 18 with a range of motion substantially identical to that of inner bearing element 27. Outer shaft 18 may move freely within fluid medium 16 with two degrees of freedom of tilt as well as rotation about its own axis. Flange 19 further secures outer shaft 18 to inner bearing element 27 and precludes any relative translational motion.

Inner shaft 30 and outer shaft 18 form a concentric transmission assembly. Inner shaft 30 transmits applied torsional, as well as X-axial and Y-axial forces to outer shaft 18. However, inner shaft 30 can also move freely, relative to outer shaft 18, in response to applied Z-axial translational forces. Handle 28, which may include an activation or deactivation switch 32, is coupled to the upper end of inner shaft 30 to allow the user to tilt, translate or rotate the transmission assembly.

Inner shaft 30 can be a hollow shaft open to the ambient environment. This avoids compression of air trapped in outer shaft 18 during Z-axis translation. Inner shaft 30 can also be partially splined so that the splined section 31 can be gripped by the rotating element of a rotation sensor as discussed in more detail below.

Outer shaft 18 supports drag assembly 20 having a first damping element 22 and a second damping element 24 which are disposed within fluid medium 16. Under specific conditions described below, damping elements 22 and 24 responsively rotate in medium 16. Furthermore, elements 22 and 24 may rotate in identical or in opposite directions. By employing a set of flanged bearings and retaining rings, as described in more detail below, damping elements 22 and 24 can maintain their axial positions with respect to each other and outer shaft 18.

Fluid medium 16 is a viscous fluid having substantially non-compressible and non-energy storing characteristics. Fluid medium 16 is preferably a silicone grease or oil having a viscosity of about 200,000 to about 2,000,000 C strokes (e.g., Dow Corning 200 fluid having a viscosity of about 600,000 cstokes) A chamber plug 14a may be included to facilitate filling and draining fluid medium 16.

In one embodiment, hand control 10 is preferably designed to have damping characteristics so as to attenuate the amplitude of movements at or about 3 Hertz. The volume of chamber 12, the mechanical dimensions of damping assemblies 22 and 24, and the viscosity of fluid medium 16 are chosen to achieve a damping constant of about 2 to 20 lbs-sec/ft, and preferably from about 5 to 15 lbs-sec/ft, for translational handle movements.

Figure 2A:
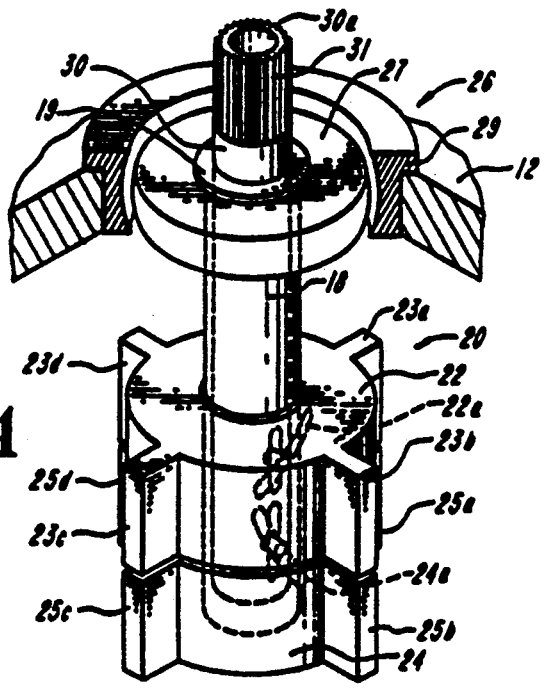
FIGS. 2A and 2B are perspective views of the inner shaft, outer shaft and drag elements of the damped control stick of FIG. 1.
Figure 2B:
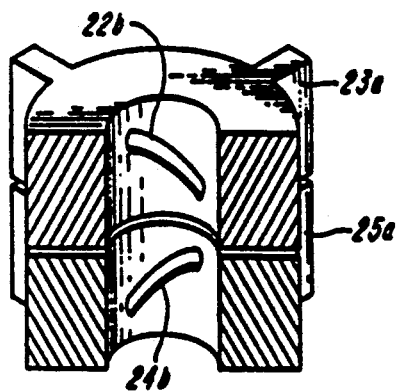

FIGS. 2A and 2B illustrate in more detail outer shaft 18, damping elements 22 and 24, and inner shaft 30. In the illustrative embodiment, damping elements 22 and 24 include a plurality of fins 23a-23d and 25a-25d, which protrude radially from the outer surface of damping elements 22 and 24, respectively. The term "fin" is used herein to encompass any radially protruding structure that serves to increase the drag element's resistance to rotation in the fluid medium. In FIGS. 2A and 2B, a fin arrangement is illustrated in which the fins are equispaced about and extend axially along the outer surfaces of drag elements 22 and 24.

FIG. 2B is a cross-sectional illustration of damping elements 22 and 24. In the illustrated embodiment, damping elements 22 and 24 include helical slots 22a,22b and 24a,24b. The helical slots are formed on the inside surface of the damping elements. The pitch of the helical slots 22a,22b and 24a,24b in each damping element 22 and 24 is symmetrical but opposite. As a result, Z-axial translational forces applied to inner shaft 30 produce an opposite rotation between damping elements 22 and 24, thereby providing a resistance to handle movements in the Z-axis direction without producing torsion about that axis. In contrast, torsional forces applied to inner shaft 30 produce rotation of both drag elements together in the same direction without inducing Z-axially motion of the handle. However, in both instances, the damping elements can rotate without axial movement relative to each other and outer shaft 18.

Figure 3:
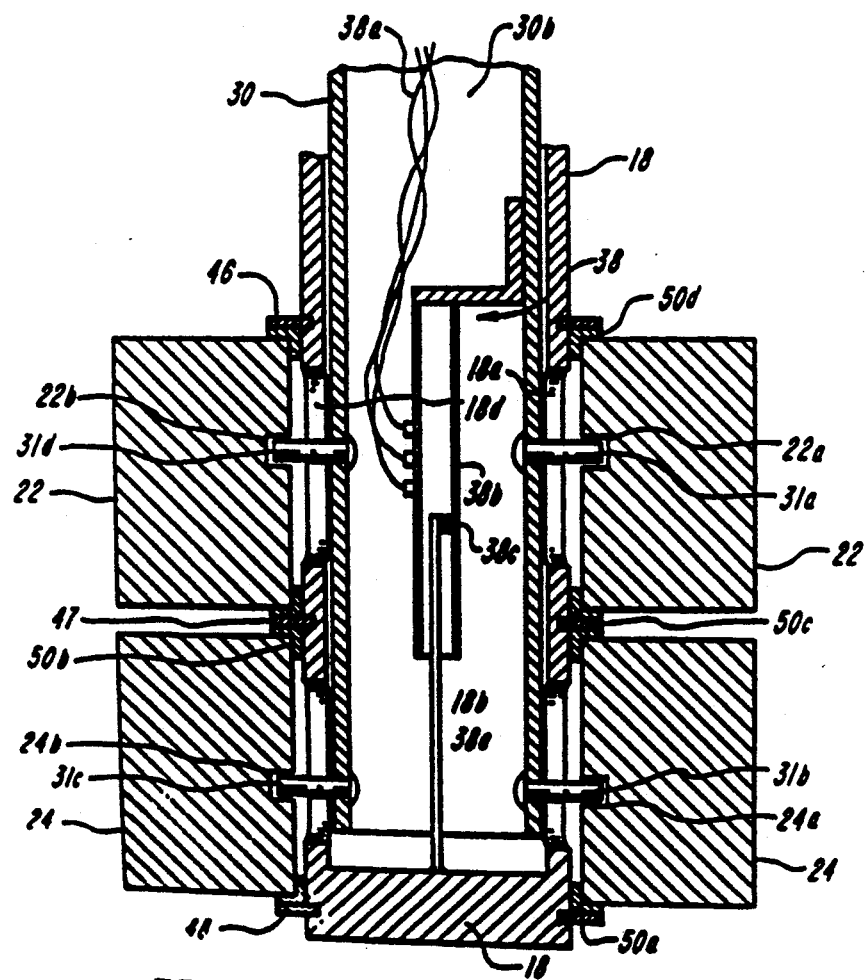
FIG. 3 is a cross-sectional view of the inner shaft, outer shaft and drag elements of the damped control stick of FIG. 1; an FIG. 4 is a perspective view of the first and second yoke assemblies, the rotation sensor assembly, and the depth sensor assembly of the damped control stick of FIG. 1.

FIG. 3 is a cross section schematic diagram of inner shaft 30, outer shaft 18 and damping elements 22 and 24. Inner shaft 30 includes thrust pins 31a-31d which protrude radially. Sealed bearings 50a-50d be employed to prevent fluid 16 from entering hollow center 30b of inner shaft 30. Thrust pins 31a-31d couple inner shaft 30 to damping assemblies 22 and 24. The thrust pins 31a-31d protrude through longitudinal slots 18a-18d in outer shaft 18. The protruding portions of the thrust pins engage the helical slots 22a, 22b and 24a, 24b formed in damping elements 22 and 24, respectively, as shown further in FIGS. 2A and 2B.

Figure 4:
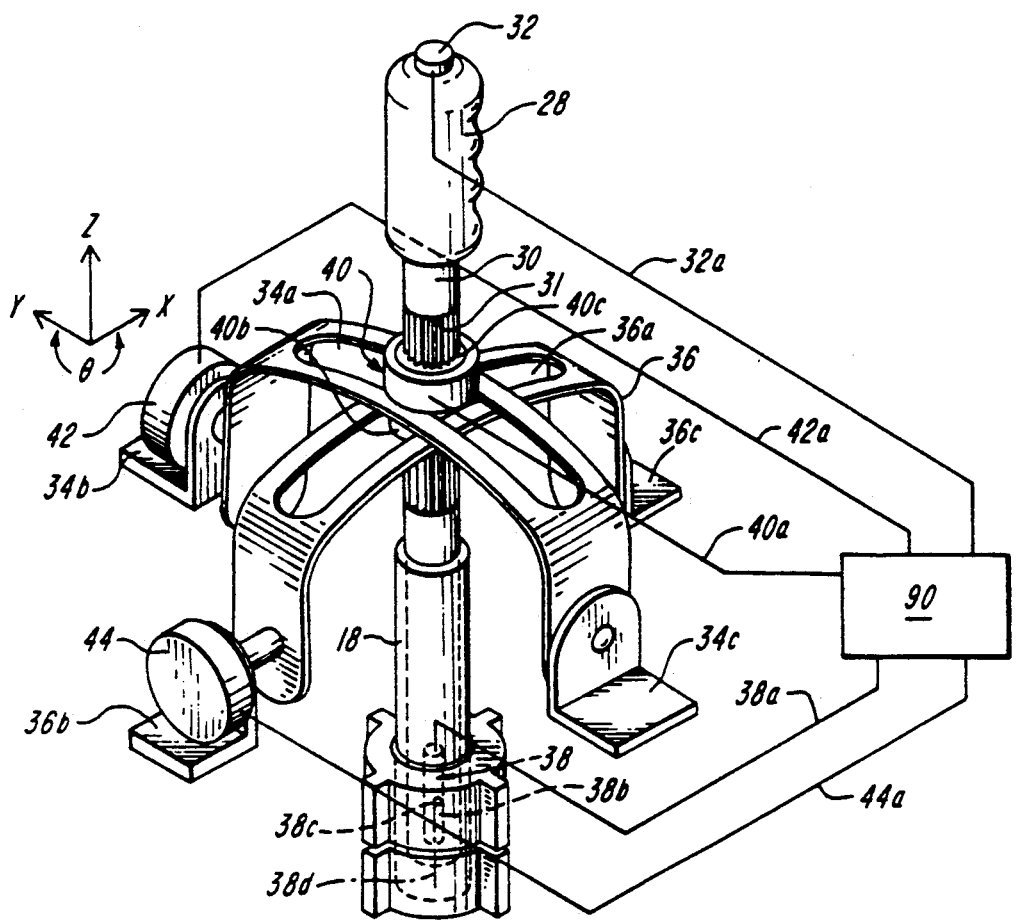

FIG. 4 illustrates in more detail inner shaft 30 and first and second yoke assemblies 34 and 36 respectively. Each yoke assembly 34 and 36 includes a longitudinal slot 34a and 36a, respectively. The inner shaft 30 is coupled to the yoke assemblies which permit inner shaft 30 to traverse either longitudinal slot without affecting the remaining longitudinal slot. In the illustrative embodiment, first yoke assembly 34 and second yoke assembly 36 are positioned orthogonally to each other. Handle 28 is connected to inner shaft 30 and can include a switch 32, as shown, coupled via line 32a to signal processor 90.

Again, with continued reference to FIG. 4, the position-sensing mechanisms of damped control device 10 include a depth sensor 38, a rotation sensor 40, X-sensor 42, and a Y-sensor 44. X-sensor 42 is mechanically coupled to first yoke assembly 34 and electrically coupled to signal processor 90 via line 42a to provide a directional information signal. Similarly, Y-sensor 44 is mechanically coupled to second yoke assembly 36 and electrically coupled to signal processor 90 via line 44a to provide a directional information signal. Sensors 42 and 44 are coupled to inner shaft 30 via yoke assemblies 34 and 36, respectively. As described above, each yoke assembly 34 and 36 includes a longitudinal slot 34a and 36a through which inner shaft 30 passes. The yoke assemblies are supported on housing 12 by brackets 34b-34c and 36b-36c. Sensors 42 and 44 may be, for example, potentiometers wherein movement of the yokes results in changes in the resistance of the potentiometers via rotation of their input shafts.

Depth sensor 38 is mechanically coupled to inner shaft 30, outer shaft 18 and electrically coupled, via line 38a, to signal processor 90 to provide Z-axis information signals. In the illustrative embodiment, depth sensor 38 is a potentiometer having a housing 38b which is mechanically coupled to inner shaft 30, and wiper 38c coupled to outer shaft 18 via rod 38d which is fixed to the lower end of outer shaft 18. This arrangement provides measurement of the depth of inner shaft 30 relative to outer shaft 18. It should be clear that the positions of housing 38b and rod 38d can also be reversed such the housing for sensor 38 is fixed to the bottom of outer shaft 18 and the rod is conversely fixed to the inner shaft 30. In any event, the relative depth of inner shaft 30 is measured as a change in the resistance of depth sensor 38 via the change in axial position of wiper 38c relative to housing 38b.

Rotation sensor 40 is mechanically coupled to inner shaft 30, and first yoke assembly 34 to sense rotation of the handle 28. Rotation sensor 40 is electrically coupled to drive mechanism 90, via line 40a, to provide rotation information signals to signal processor 90. In the illustrative embodiment, rotation sensor 40 is a potentiometer having a housing 40b which is mechanically coupled to first yoke assembly 34 permitting it to slide in slot 34a but not rotate. This can be accomplished, for example, using a housing threaded to receive a retaining nut, with flats on opposite sides of the housing to permit the housing to slide within the yoke slot while precluding rotation of housing relative to the yoke.

The splined segment 31 of inner shaft 30 is coupled to the wiper 40c of rotation sensor 40. Wiper 40c has a mating splined interior to receive inner shaft 30. In operation, the rotation of inner shaft 30 is measured by the change in the resistance of rotation sensor 40 through the rotation of wiper 40c.

In operation, damped control device 10 utilizes damping assembly 20 to suppress unwanted vibrations transmitted by the user to handle 28 resulting from, for example, turbulence in an air vehicle or rough terrain in a land vehicle. Drag assembly 20 is designed to provide independent vibration suppression wherein each degree of freedom damped is decoupled from all others. That is to say, damped control device 10 may, for example, suppress vibrations effecting the depth along the Z axis without producing movement in the X, Y, or $\theta$ directions.

For example, when an X-axial force is applied to handle 28 by the user, the force is transmitted to inner shaft 30. Inner shaft 30 then transmits the applied force to outer shaft 18, and the entire shaft assembly responsively pivots. As a result, drag element 20 moves through fluid medium 16. Vibrational energy associated with movement along the X-axis will be quickly dissipated within fluid medium 16. Similarly, unwanted vibration along the Y-axis, as well as intermediate orientations, will be attenuated in the same way.

When a torque in either the $+\theta$ or $-\theta$ direction is applied to the handle by the user, it is transmitted to inner shaft 30. As described above, inner shaft 30 is coupled to outer shaft 18 and drag assembly 20 via thrust pins 31a-31d. Consequently, in response to the torsional motion, pins 31a-31d bear on the respective longitudinal sides of longitudinal lots 18a-18d causing the inner and outer shafts (as well as the inner element 27 of spherical bearing 26) to rotate together. As a result, damping elements 22 and 24 each rotate within fluid medium 16 in the same direction. Thus, energy associated with undesired rotational vibrations will also be dissipated within fluid medium 16.

A force in the $-Z$ direction, applied to the handle by the user, is also transmitted to inner shaft 30. In response to the depth motion, thrust pins 31a-31d will travel in the $-Z$ direction in longitudinal slot 18a-18d of outer shaft 18. Since the thrust pins also engage helical slots 22a-22b and 24a-24b of damping elements 22 and 24, respectively, Z-axial motion causes opposite relative rotation of the damping element. That is to say, in response to $-Z$-axial motion, first damping assembly 22 rotates in the $-\theta$ direction and second damping assembly 24 rotates in the $+\theta$ direction.

Damping elements 22 and 24 remain axially adjacent due to the flanges of bearings 50a-50d and snap rings 46, 47 and 48 which prevent drag elements 22 and 24 from moving axially. The motion of the damping assemblies likewise results in a transfer of the energy induced by translational vibrations to fluid medium 16.

It should also be clear that modifications and variations of the present invention are possible in light of the above teachings. Such additions, substitutions and other arrangements are intended to be covered by the appended claims.

What is claimed is:

1. A hand control device capable of damping motions during operation by a user, the device comprising:
   a chamber filled with a viscous fluid;
   a transmission assembly comprising a first inner shaft coupled to a second outer shaft and concentric with each other, said first shaft having a handle to be held by the user and said second shaft being at least partially disposed within said fluid of said chamber;
   drag means coupled to said second shaft of said transmission assembly and disposed within said fluid for damping motion of said transmission assembly; and
   position-sensing means disposed about the transmission assembly for sensing the position of said transmission assembly relative to a defined reference frame and for generating electrical signals indicative of said position, said position-sensing means being activated by said first shaft during operation to generate electrical signals when said shaft is displaced from said reference frame.

2. The hand control device of claim 1 wherein said first shaft further includes at least one thrust pin to couple said first shaft to said second shaft and said drag means, such that upon rotation or translation of said first shaft, a force is applied to said drag means.

3. The hand control device of claim 1 wherein said drag means rotates in said fluid upon rotational motion of the transmission assembly.

4. The hand control device of claim 1 wherein said drag means rotates in said fluid in response to translational motion of the transmission assembly.

5. The hand control device of claim 1 wherein said drag means includes a plurality of radial protrusions along the outer surface of said drag means.

6. The hand control device of claim 1 includes at least two drag elements coupled to said transmission assembly and being disposed within said fluid to damp motions of said first shaft.

7. The hand control device of claim 6 wherein said drag elements include a plurality of radial protrusions along the outer surface of said drag elements.

8. The hand control device of claim 6 wherein said drag elements rotate in said fluid upon rotational motion of the transmission assembly.

9. The hand control device of claim 6 wherein said drag elements rotate in said fluid in response to translational motion of the transmission assembly.

10. The hand control device of claim 6 wherein said first shaft further includes at least one thrust pin to couple said first shaft to said second shaft and said drag elements, such that, upon rotation or translation of said first shaft, movement is imparted to said drag elements.

11. The hand control device of claim 10 wherein said second shaft includes a longitudinal slot to accommodate translation of said thrust pin and each drag element includes a helical slot on the inner surface of said drag element to receive the protruding portion of said thrust pin.

12. The hand control device of claim 11 wherein the pitch of said helical slot in one damping element is opposite in direction to the pitch of the helical slot in the other damping element, so that axial translation of said first shaft produces opposite rotations of the drag elements.

13. The hand control device of claim 9 wherein said transmission assembly includes an opening to the ambient environment to avoid compression of air during translation of said first and second shafts with respect to each other.

14. The hand control device of claim 1 wherein said position-sensing means further includes means for sensing the position of said first shaft relative to a reference frame and for generating electrical signals indicative of said position.

15. The hand control device of claim 13 wherein position-sensing means further includes means for sensing the torsional, translational and tilting motion of said first shaft.

16. The hand control device of claim 14 wherein position-sensing means includes
- first and second orthogonally-positioned sensors coupled to said transmission assembly, such that lateral displacement of the first shaft alters electrical signal from one or both of said first and second sensors;
- a third sensor coupled to said transmission assembly, such that torsional motion of the first shaft alters electrical signal from said third sensor; and
- a fourth sensor coupled to said transmission assembly, such that translational motion along the axis of the transmission assembly alters electrical signal from said fourth sensor.

17. The hand control device of claim 6 wherein said drag elements and said fluid cooperate to achieve a damping constant of about 2 to about 20 lbs-sec/ft.

18. The hand control device of claim 6 wherein said drag elements and said fluid cooperate to achieve a damping constant of about 5 to about 15 lbs-sec/ft.

19. The hand control device of claim 6 wherein said viscous fluid comprises a silicone oil having viscosity ranging from about 200,000 to about 2,000,000 cstokes.

20. The hand control device of claim 15 wherein said position-sensing means is coupled to a signal processing means which controls a motor-driven machine, such that said electrical signals generated by position-sensing means are used to effect movement of said machine.

21. The hand control device of claim 20 wherein the motor-driven machine is a vehicle.

22. The hand control device of claim 20 wherein the motor-driven machine is a helicopter.

* * * * *